(12) United States Patent
Geissler et al.

(10) Patent No.: US 12,443,184 B2
(45) Date of Patent: Oct. 14, 2025

(54) SMART SANITATION ROBOT

(71) Applicant: Intel Corporation, Santa Clara, CA (US)

(72) Inventors: Florian Geissler, Munich (DE); Say Chuan Tan, Penang (MY); Chien Chern Yew, Penang (MY); Ying Wei Liew, Sg Ara (MY); Neslihan Kose Cihangir, Munich (DE)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/553,850

(22) Filed: Dec. 17, 2021

(65) Prior Publication Data

US 2022/0107642 A1 Apr. 7, 2022

(51) Int. Cl.
| | |
|---|---|
| *G05D 1/00* | (2024.01) |
| *A47L 9/28* | (2006.01) |
| *A47L 11/40* | (2006.01) |
| *G01D 21/00* | (2006.01) |

(Continued)

(52) U.S. Cl.
CPC .......... *G05D 1/0088* (2013.01); *A47L 9/2826* (2013.01); *A47L 9/2852* (2013.01); *G01D 21/00* (2013.01); *G05B 13/027* (2013.01); *A47L 11/4011* (2013.01); *A47L 2201/04* (2013.01); *A47L 2201/06* (2013.01); *G05B 15/02* (2013.01)

(58) Field of Classification Search
CPC .. A47L 11/4011; A47L 9/2826; A47L 9/2852; A47L 2201/04; A47L 2201/06; G05D 1/0088; G01D 21/00; G05B 13/027; G05B 15/02
See application file for complete search history.

(56) References Cited

U.S. PATENT DOCUMENTS

| | | | |
|---|---|---|---|
| 2018/0272540 A1* | 9/2018 | Cronin | .................... A47L 1/00 |
| 2019/0029486 A1 | 1/2019 | Suvarna et al. | |
| 2019/0064815 A1* | 2/2019 | Haynes | ............... B60W 30/095 |

(Continued)

FOREIGN PATENT DOCUMENTS

| | | |
|---|---|---|
| CN | 109602343 A | 4/2019 |
| CN | 111568314 A | 8/2020 |
| CN | 111657798 A | 9/2020 |

OTHER PUBLICATIONS

European Search Report issued for the corresponding European patent application No. 22200262.8, dated Jul. 5, 2023, 9 pages (for informational purposes only).

(Continued)

*Primary Examiner* — Thomas E Worden
*Assistant Examiner* — Jay Khandpur
(74) *Attorney, Agent, or Firm* — Viering, Jentschura & Partner mbB

(57) ABSTRACT

Disclosed herein are systems, devices, and methods of a sanitation system for intelligently adapting the cleaning operations of a sanitation robot. The sanitation system detects a plurality of objects in a workspace and then, for each detected object of the plurality of objects, determines a sanitation score for the detected object based on observations of the detected object over a time period. The sanitation system generates a cleaning schedule based on the sanitation score for each detected object, wherein the cleaning schedule comprises instructions for a sanitation robot to clean the plurality of objects.

18 Claims, 3 Drawing Sheets

(51) Int. Cl.
  *G05B 13/02*        (2006.01)
  *G05B 15/02*        (2006.01)

(56) References Cited

U.S. PATENT DOCUMENTS

| | | | |
|---|---|---|---|
| 2020/0100639 A1* | 4/2020 | Ullmann | G05B 19/19 |
| 2021/0346543 A1* | 11/2021 | Brooks | G01C 21/206 |
| 2022/0287530 A1* | 9/2022 | Xi | G06V 20/64 |
| 2024/0118714 A1* | 4/2024 | Ebrahimi Afrouzi | A47L 11/4011 |
| 2025/0000320 A1* | 1/2025 | Sun | A47L 11/4011 |

OTHER PUBLICATIONS

A. Abdalwhab et al., "Zero-Shot Object Detection for Indoor Robots" International Joint Conference on Neural Networks, IEEE, Jul. 14-19, 2019, Budapest, Hungary.

Y. W. Chao et al., "Learning to Detect Human-Object Interactions" 2018 IEEE Winter Conference on Applications of Computer Vision (WACV), IEEE, 10 pages.

D. Zmaranda et al., "Using Fixed Priority Pre-emptive Scheduling in Real-Time Systems" International Journal of Computers, Communications & Control (IJCCC), Apr. 2011, vol. VI, No. 1, pp. 187-195.

Fraunhofer, "Desinfection robot: Value crated by linnking up to building data", Recearch News, May 3, 2021, 3 pages.

* cited by examiner

SMART SANITATION ROBOT

TECHNICAL FIELD

The disclosure relates generally to mobile robots, and in particular, to systems, devices, and methods that relate to robots that perform sanitation tasks and may be operating in complex environments.

BACKGROUND

Germs and harmful pathogens may jeopardize the medical safety of persons living or working together in a common space. Germs may spread due to the fact that many persons touch the same surfaces and objects, such as door handles, faucets, pens, glasses, etc. To reduce the spread of germs, high-contact surfaces should be identified and sanitized regularly. Sanitation robots may assist in regularly cleaning surfaces. However, existing sanitation robots typically have only predefined cleaning routines and limited intelligence, where such robots may only be able to perform fixed cleaning routes and adjust their path to accomplish the routine. As a result, high-contact surfaces may not receive sufficient cleaning to effectively reduce the spread of germs.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
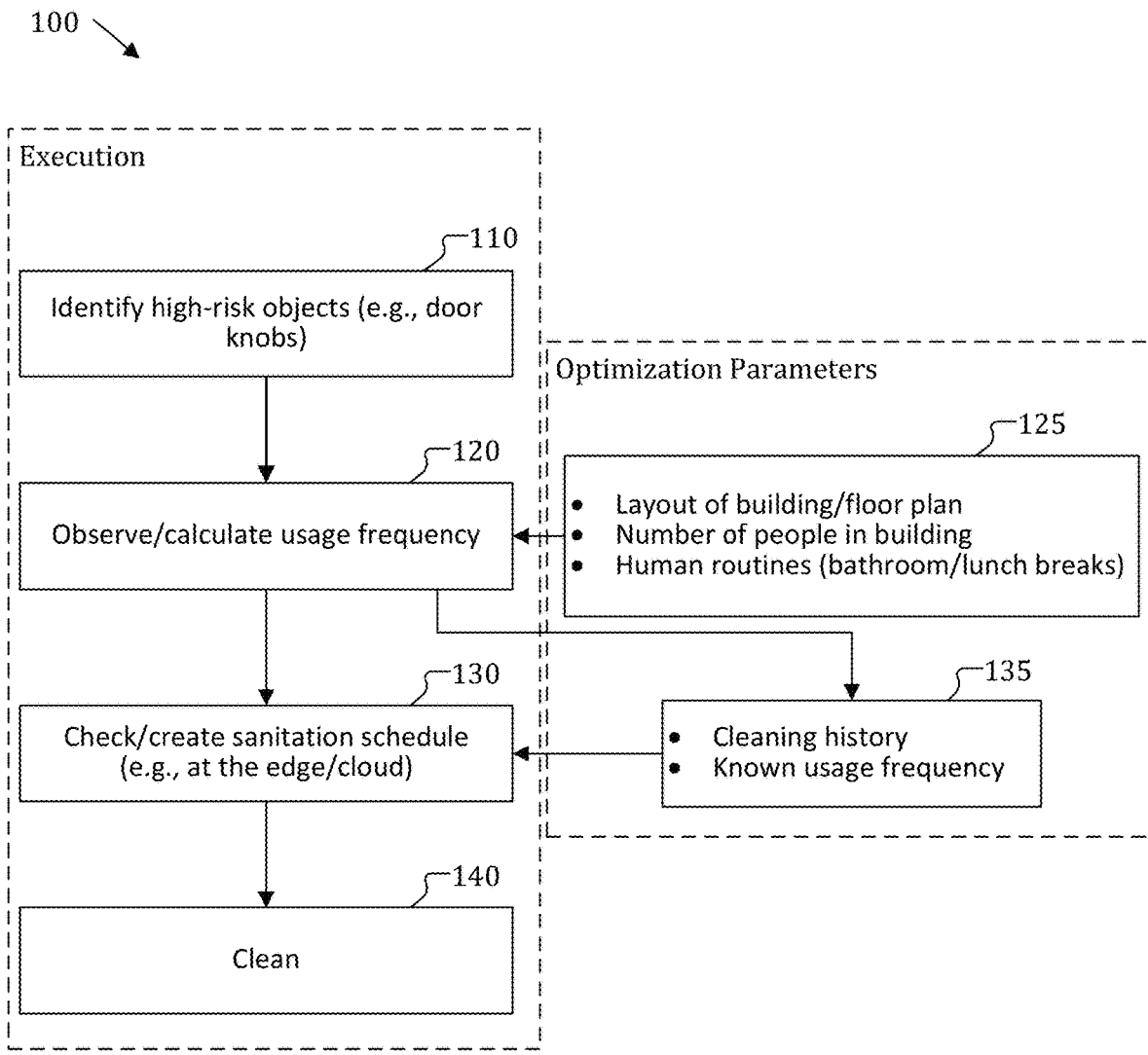
FIG. 1 shows an exemplary smart sanitation system for adapting the cleaning operations of a sanitation robot.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. Reference is made herein to a "workspace" as any area in which a robot may be located or to which it may move in order to perform sanitation tasks. As should be appreciated, a "workspace" is meant to encompass any area, including, for example, a room, multiple rooms, an air duct, a plurality of air ducts, an entire floor of a building, multiple floors of a building, an entire building, multiple buildings, a factory, an airport, a shopping mall, a train station, a bus terminal, etc.

To reduce the spread of germs within a workspace, high-contact surfaces should be identified and sanitized regularly. To assist with regular sanitation, sanitation robots (e.g., cleaning robots) may be used. While automated sanitation robots currently exist, they are of limited intelligence. Such sanitation robots typically enter a room and simply execute a predefined routine to disinfect all surfaces, clean the entire floor, vacuum along a particular surface, etc. In addition, if such sanitation robots come in contact with or are nearby a human, the robot may simply stop its predefined routine until the human is no longer nearby or reroute itself around the human. In addition, because such robots typically execute a predefined routine, they may not be able to dynamically identify which objects are in need of cleaning, dynamically identify which objects should be prioritized for sanitation, or dynamically adjust their cleaning routine, schedule, cleaning substance, or task to adapt to priorities or current situations. This leads to ineffectively cleaned workspaces that may continue to contain and spread germs and harmful pathogens.

As should be apparent from the detailed disclosure below, the disclosed sanitation system is able to perceive the robot's workspace and to identify high-risk objects that are in need of cleaning (e.g., quickly soiled locations or high-touch areas that are touched regularly by multiple persons), and then adapt the robot's cleaning routine in the workspace to efficiently and intelligently clean the identified objects with a dynamically updated and optimized sanitization schedule. As a result, the disclosed sanitation system may be customized for any workspace and specifically adapted to the needs of the workspace, the use of the workspace, and the current cleaning situation of workspace. This may lead to more effectively-cleaned workspaces with a reduced likelihood of spreading germs and harmful pathogens.

FIG. 1 shows a sanitation system 100 for adapting the cleaning operations of a sanitation robot. Sanitation system 100 may make a situationally-aware sanitation assessment of a workspace and adapt the cleaning actions of a sanitation robot based on observations of the workspace. The sanitation system 100 may create and dynamically update an optimal sanitization schedule based on any number of sanitation-relevant observations about the workspace and the relevant human contact with the workspace. Sanitation system 100 may be implemented as a device with a processor that is configured to operate as described herein. The device may operate as part of a server that is remote to the sanitation robot (e.g., a cloud-based or edge server), may be integrated into the robot, or may have processing/sensors that are distributed across various locations. The sanitation system 100 may include a receiver, transmitter, and/or transceiver (e.g., a wireless modem), for communicating information among the various processing locations. The sanitation system 100 may be associated with a sanitation robot that may move about a workspace to be cleaned (e.g., it may have wheels, chains, legs, the ability to climb stairs, ramps, etc.). The sanitation robot may also have a cleaning device to perform various cleaning tasks which may use various cleaning substances. The sanitation system 100 may also receive sensor data from sensors that are located on the robot and/or located in the workspace. In addition, sanitation system 100 may store information associated with the sanitization schedule and sanitation-relevant observations in a memory.

Sanitation system 100 may be configured to execute a number of steps to dynamically adjust a cleaning operation for a sanitation robot, and the dynamic adjustment may be based on observations about the workspace and/or other optimization parameters. In step 110, the sanitation system 100 may identify objects in the workspace for cleaning. Such objects may include, for example, a door handle, a faucet handle, a table surface, a coffee pot, a light switch, etc., that humans frequently touch or other objects that are easily soiled or prone to transfer germs. To detect objects that may be in need of cleaning, the sanitation system 100 may use a pretrained object detection model that associates human interaction with high-risk objects/areas, a machine-learning model, or other types of artificial intelligence learning models, each of which may utilize sensor data from any number of sensors (e.g., cameras, motion detectors, light ranging and detection (LiDAR) sensors, biological sensors, chemical sensors, radar sensors, infrared sensors, etc.). The sanitation system 100 may customize the object detection by training a network based on expected object classes. As should be appreciated, sensor data from biological sensors, chemical sensors, etc. may be particularly relevant for detecting high-risk objects or locations (e.g., due to bacteria or a virus in the air). In addition, the sanitation system 100 may use sensor data to determine the type of surfaces that are associated with each high-risk object so that the sanitation system 100 may select an optimal cleaning substance and/or cleaning method for each detected object.

In step 120, the sanitation system 100 may estimate a quantitative risk level (e.g., a sanitation score) associated with each detected object based on any number of observations about the objects. Such observations may include the frequency with which humans interact with the particular object or the manner in which the particular object is touched over the time period (e.g., a duration of a touch, an extent of area covered by the touch, or a force associated with the touch). But of course, any observations about the object and/or workspace may be relevant to determining the sanitation score. For example, the sanitation system 100 may utilize observation parameters 125 to estimate the quantitative risk, including for example, the layout of the workspace/building (e.g., a site plan, a floor plan, an office configuration), the number of people in the building (e.g., observed by cameras or counted by identification-badge check-ins/-outs, etc.), and/or traffic patterns associated with human routines (e.g., start/stop times, lunch/break times, bathroom usage, etc.).

To determine the sanitation score, the sanitation system 100 may use a learning model that starts with predefined weights associated with observations about each object (e.g., its classification, its location within the workspace, etc.). The predefined weights may be based on general knowledge about the object and its associated observations. For example, objects such as cups, mugs, chairs, tables, pens, faucets, door handles, plates, cutlery, handrails may be associated with a high initial sanitation score. Objects such as windows, doors, walls, cupboards, etc. may be associated with a low initial sanitation score. The sanitation system 100 may then make observations of the workspace over time to learn how humans interact with the detected objects to update the learning model. The sanitation system 100 may use any of the sensor data/observations for this purpose. For example, sanitation system 100 may use camera images or video data from cameras to monitor the number, length, frequency, and types of interactions with each object.

The sanitation system 100 may continuously observe the workspace to update the sanitation score as the workspace changes. The sanitation system 100 may make the updates in real-time, at regular intervals, or at irregular intervals, and the update interval may depend on the type of workspace, the time of day, the day of the week, etc. As explained above, the sanitation score may be a quantitative value of risk, and the sanitation system 100 may determine this quantitative value of risk based on a number of factors (e.g., observations). Such factors may include, for example, the number of human-object interactions observed in a given time period; the number of humans populating the workspace (e.g., the higher the population, the higher the risk); the layout of the workspace and the object's proximity to high-traffic areas (e.g., objects close to the reception area, bathrooms, kitchens, cafeterias, conference rooms, may have higher risk; objects close to designated pathways throughout the workspace (e.g., doorways, corridors, stairwells, elevators, bridges, etc.) may have higher risk); and/or traffic patterns associated with human routines (e.g., a typical time for lunch, the opening/closing hours, scheduled times for airline arrivals/departures, etc.) where higher or lower traffic may occur at routine times. As should be appreciated, the factors are merely examples, and the sanitation system 100 may utilize any number factors associated with observations of the workspace to estimate the quantitative risk.

The sanitation system 100 may combine any of the factors discussed above to determine a global sanitation risk level (e.g., sanitation score). For example, the sanitation system 100 may multiply each factor ($f_i$) by an associated weighting coefficient ($\alpha_i$) and then summing the results to arrive at the overall risk level:

$$\text{Risk} = \sum_{i=1}^{N} \alpha_i f_i$$

As should be appreciated, the above-listed formula is merely exemplary, and any number of other formulas may be used to determine the global sanitation risk level from relevant factors. For example, sanitation system 100 may use a sliding average with previously determined sanitation scores from previous observation time periods. In addition, the sanitation system 100 may apply a minimum cleaning frequency for objects so that the time between cleanings may be a factor in the risk level determination. In this way, as the time increases since an object's previous cleaning, the object's sanitation score will also increase (and therefore prioritized for cleaning), so that the sanitation system 100 may still clean low-risk, low-touch objects with a minimum frequency.

In step 130, the sanitation system 100 may create a cleaning schedule that the sanitation system 100 may customize/optimize according to the sanitation score for each object. The sanitation system 100 may continuously update the cleaning schedule at regular or irregular intervals in order to account for new objects that the sanitation system 100 may detect in the workspace, changes in the occupancy of (e.g., the number of humans in) the workspace, etc. When creating the cleaning schedule, the sanitation system 100 may also take into account any of the observation parameters 125 discussed above, including for example, the layout of the workspace/building, the location of cleaning supplies, the number of people in the building, and/or traffic patterns associated with human routines. In addition, the cleaning schedule may be a global cleaning schedule that utilizes multiple sanitation robots to perform specified cleaning task(s) at an associated time. The sanitation system 100 may transmit (via a transmitter) the global cleaning schedule to each sanitation robot so that each sanitation robot may execute their respective cleaning task(s) and the appropriate time(s). Aspects of optimizing the cleaning schedule are discussed in more detail with respect to FIG. 2 below.

As noted earlier, the sanitation system 100 may operate as part of a server that is remote to the sanitation robot (e.g., a cloud-based or edge server), and step 130 may be preferably located on a server that is remote to the sanitation robot (e.g., at an edge/cloud server), where the edge server may also draw on the experience of other sanitation robots by maintaining a database 135 of known observations, known cleaning histories, known usage frequencies, known sanitation scores, and known observation parameters that may be helpful to train a learning model associated with scheduling cleaning tasks for the objects. In addition, the sanitation system 100 may base the cleaning schedule on grouping objects that have a similar surface type, that require a similar cleaning substance/device, that are associated with a similar amount of cleaning effort/time, etc. In step 140, the sanitation system 100 generates an instruction for the sanitation robot (or robots) to carry out the determined cleaning schedule.

As should be apparent from the above description, sanitation system 100 may have several advantages over prior system for sanitation robots. In particular, sanitation system 100 may dynamically identify each individual, potentially contaminating object. In addition, the sanitation system 100 may use a customized perception strategy to focus on cleanable objects with a potentially high risk of contamination. The sanitation system 100 may be considered dynamic because it may operate continuously to adapts to changes in the workspace. As new objects may be added into or removed from a workspace (e.g., a coffee cup is placed on a table, an extra chair is brought into a conference room, a file-folder is placed on a desk, etc.), the sanitation system 100 may detect the arrival of the object (or its removal) and update the cleaning schedule to account for the newly added or removed object. For example, if additional chairs are temporarily added to a conference room, there may be a greater need for cleaning the conference room, whereas if the chairs are removed from the conference room, there is less of a need to clean the conference room. In such a manner, the sanitation system 100 may efficiently adapt the cleaning tasks of the cleaning robots to the actual cleaning needs of the workspace.

In addition, sanitation system 100 may provide a dynamic, observation-based estimation of the health risk associated with a specific object. Dynamic adjustments may be beneficial because the health risk level of an object (e.g., its sanitation score) may not be static or simply based on the type of object. For example, both a coffee cup and a flower vase may be in a category of "vessel," but each object has a different sanitation risk associated with it because the coffee cup may be handled more frequently than the flower vase. Similarly, two objects that are the same may be associated with a different sanitation risk depending on each object's location within the workspace. For example, a handrail in an emergency stairwell of a building may be touched infrequently compared to a handrail located at the main entrance of the building. The sanitation system 100 may dynamically adjust the cleaning schedule based on observations (e.g., frequency of usage) in order to, for example, prioritize high-risk, high-touch areas. In this way, sanitation system 100 may intelligently assess sanitation risks, even for objects that may have been previously unknown to the sanitation system 100.

In addition, sanitation system 100 may create an optimized cleaning schedule based on the risk level (e.g., sanitation score) of each detected object and other observations about the workspace such as building layouts, human habits, group dynamics, etc. This allows sanitation system 100 to generate a cleaning schedule that efficiently prioritizes limited cleaning resources to update the cleaning schedule continuously to react to the changes in the scene. For example, if sanitation system 100 had prioritized cleaning of conference room A because it had a large number of chairs, but the chairs were later transferred to conference room B, the sanitation system may revise the cleaning schedule to reprioritize cleaning conference room B above cleaning conference room A due to the change. This is different from existing sanitation robots that may only be able to adjust their paths to avoid obstacles, where such robots typically execute a predefined, universal cleaning schedule (e.g. "mop the entire floor in this room", "disinfect all surfaces") that may not be updated to reflect the changed cleaning needs of the workspace.

Figure 2:
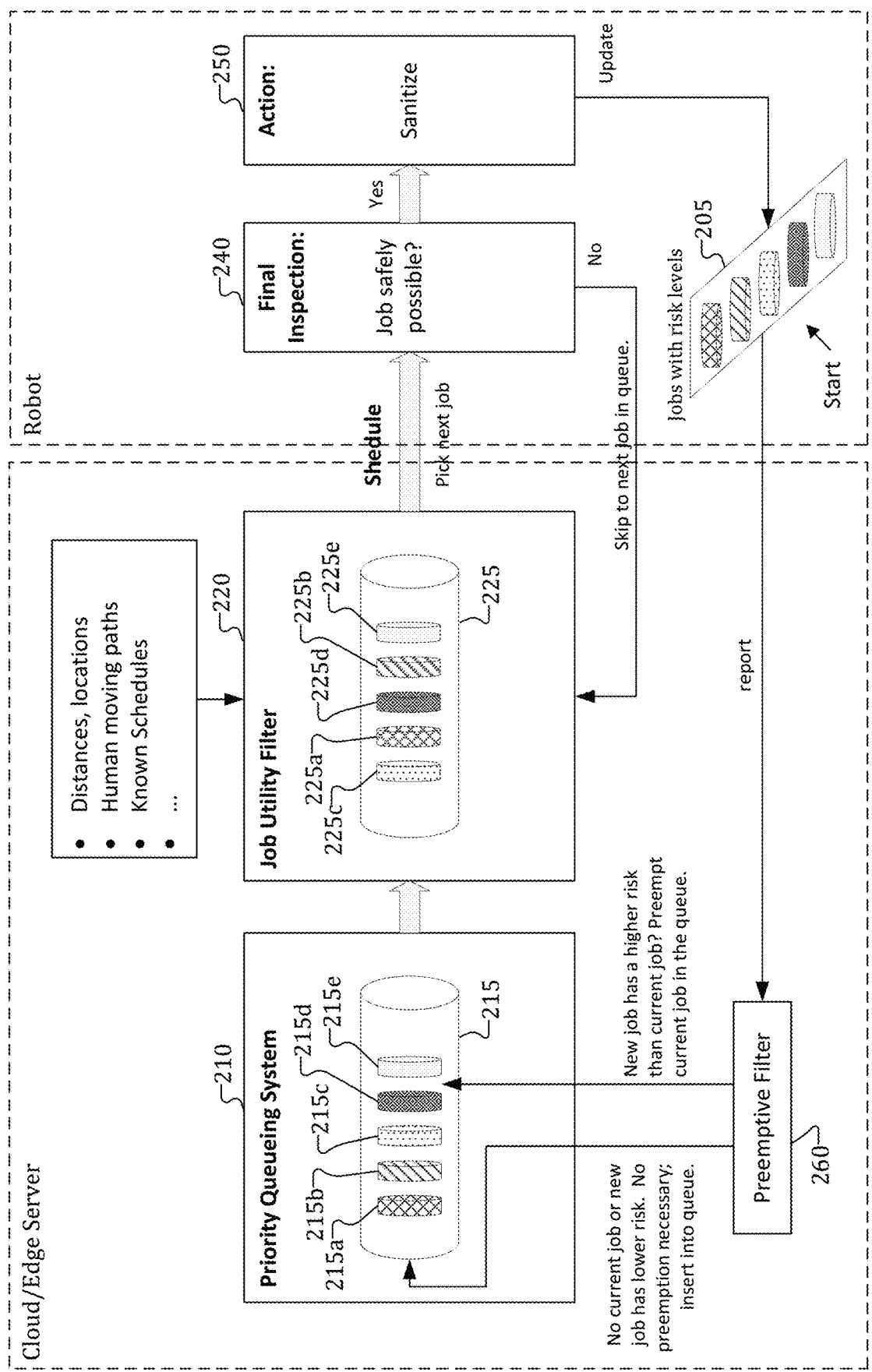
FIG. 2 depicts an exemplary flow diagram of a how a smart sanitation system may generate and optimize a cleaning schedule for a sanitation robot.

FIG. 2 shows a flow diagram of how sanitation system 100 may generate and optimize a cleaning schedule for a sanitation robot. It should be appreciated that FIG. 2 is merely exemplary, and this example flow diagram is not intended to limit sanitation system 100, which may be implemented in any number of ways and may have any or none of the aspects discussed below.

The flow diagram may start at job buffer 205 where the sanitation system 100 may report a set of localized jobs (e.g., cleaning tasks) with associated risk levels (e.g., sanitation scores) to a preemptive filter 260. The sanitation system 100 may perform the preemptive filtering when the sanitation robot or robots are already in operation. This means that sanitation system 100 may interrupt the current cleaning task (e.g., job) of a given sanitation robot if a more important task provided in an update from job buffer 205. In FIG. 2, this preemption is shown by the two different arrows leading from preemptive filter 260 to priority queuing system 210. As can be seen, if the new job has a higher risk level (e.g., sanitation score) than the current job in the job queue 215, the preemptive filter may place the new job in the job queue 215 such that it preempts the current job (e.g., is scheduled to occur before the current job completes). If there is no current job or the new job has a lower risk level (e.g., sanitation score), no preemption is necessary and preemptive filter 260 places the job into job queue 215 according to its associated risk level.

The priority queueing system 210 arranges the jobs in job queue 215 by their associated risk level. As shown in FIG. 2, job 215a has the lowest risk level, followed by 215b with a higher risk level, then 215c with an even higher risk level, then 215d with an even higher risk level, a finally 215e with the highest risk level in job queue 215. The priority queueing system 210 passes the job queue 215 to the job utility queueing system 210.

The job utility queueing system 210 may rearrange the jobs in job queue 215 to a utility job queue 225 by taking into account other factors, such as the locations of objects associated with a given job, the locations of the cleaning robot and/or other robots, high traffic areas where humans may cause interruptions to a job, timing of the job that may conflict with known routines (e.g., arrival/departure times, lunch/break times, etc.). As noted earlier, these may be obtained by the sanitation system 100 from sensor data associated with observations and/or knowledge about the workspace. Based on these factors, the job utility filter 220 may generate a utility value associated with the particular job. For example, the job utility filter 220 may multiply the determined risk value (e.g., sanitation score) with the inverse of the estimated time to complete the job, such that: the more important the job, the higher the utility value; and the shorter the job, the higher the utility value. The job utility filter 220 may calculate the utility value for each robot individually, especially if each robot is located at a different location in the workspace.

As shown in FIG. 2, job utility filter 220 has rearranged the jobs by utility value such that utility job queue 225 contains job 225c with the lowest utility value, followed by 225a with a higher utility value, then 225d with an even higher utility value, then 225b with an even higher utility value, and finally 225e with the highest utility value. The job utility filter 220 may then transmit the utility job queue 225 to the cleaning robot or robots in the workspace that are available for receiving cleaning tasks, where the job utility filter 220 may tag each job in the utility job queue 225 to indicate which job is assigned to which robot.

Each cleaning robot that receives utility job queue 225 then the sanitation system 100 selects the next job from utility job queue 225 that is assigned to the robot. The sanitation system 100 may perform a safety check (e.g., at the robot) as final inspection 240 to verify that the newly assigned job is safe to execute (e.g., it will not block a high-traffic area, cause harm to nearby humans, etc. based on the current situation of the workspace). If it is not possible to safely execute the newly assigned job, the sanitation system 100 selects the next job in the utility job queue 225 that is assigned to the robot. Once the final inspection 240 indicates a selected job is safe to execute, the robot executes the job (e.g., sanitization action 250), while the sanitation system 100 may continue to observe the environment for new objects, make observations about the objects and the workspace, and update the job buffer 205 with remaining jobs and their associated risk levels for providing to the preemptive filter 260, where the optimization of the cleaning schedule may repeat.

As noted earlier, the sanitation system 100 may operate as part of a server that is remote to the sanitation robot (e.g., a cloud-based or edge server), may be integrated into the sanitization robot, or may have processing/sensors that are distributed across various locations. As shown in FIG. 2, the preemptive filter 260, the priority queuing system 210, and the job utility filter 220 may be located or performed on a cloud/edge server that is remote from the sanitization robot, whereas the final inspection 240, sanitization action 250, and job buffer 205 may be located or performed on the sanitization robot. Of course, the distribution of components and systems as depicted in FIG. 2 is merely exemplary, and this particular implementation is not intended to limit sanitation system 100 which may be distributed across any number of locations in any manor.

Figure 3:
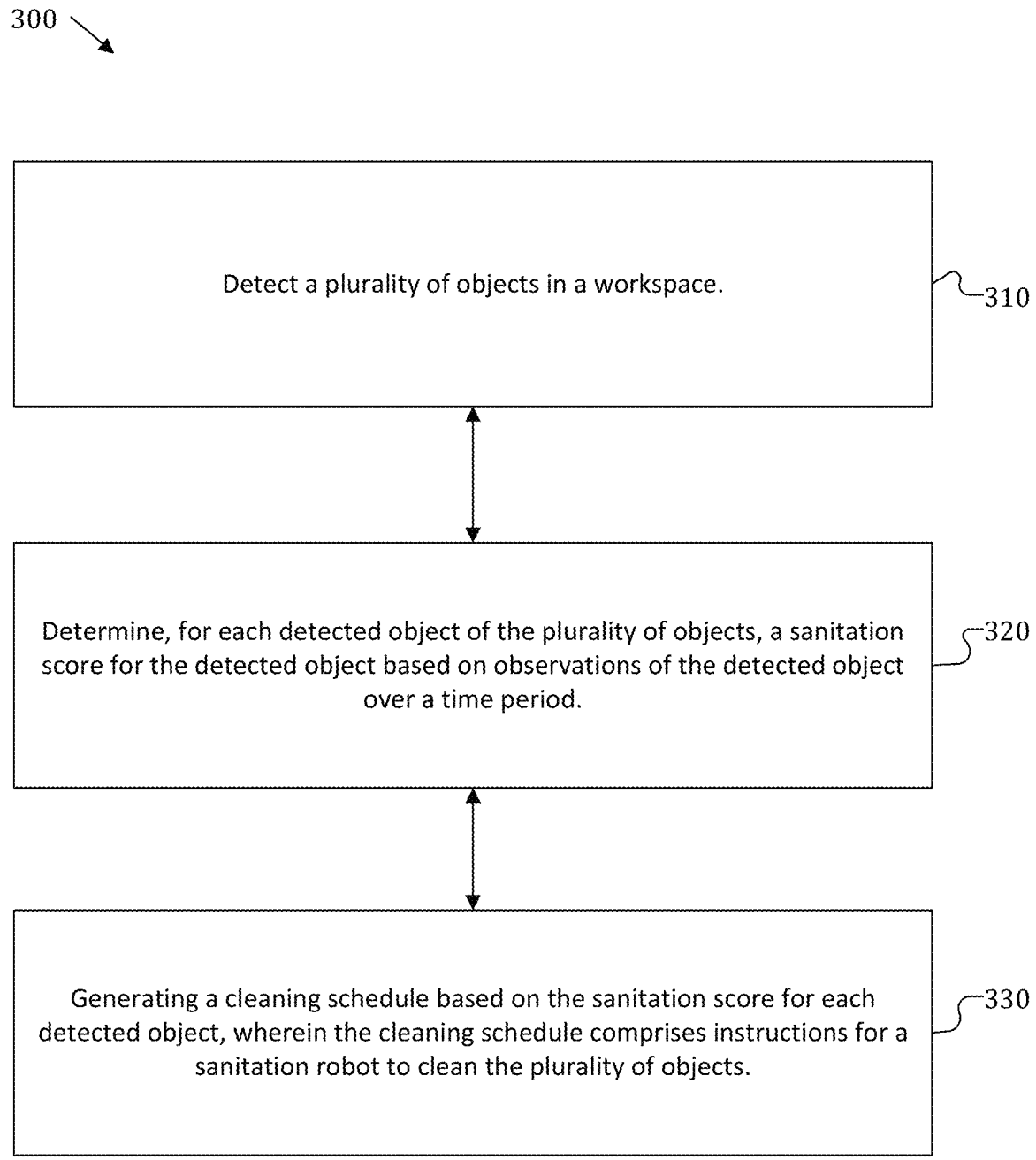
FIG. 3 illustrates an exemplar schematic flow diagram of a method for adapting a cleaning schedule for a sanitation robot based on a sanitation score.

FIG. 3 depicts a schematic flow diagram of a method 300 for adapting the cleaning operations of a sanitation robot. Method 300 may implement any of the sanitation system features described above with respect to sanitation system 100.

Method 300 includes, in 310, determining a monitored attribute of a person within an operating environment of a robot, wherein the monitored attribute is based on received sensor information about the person in the operating environment. Method 300 also includes, in 320, determining a risk score for the person based on the monitored attribute, wherein the risk score is defined by a collision probability that the person will cause an interference during a planned operation of the robot and a severity level associated with the interference. Method 300 also includes, in 330, generating a mitigating instruction for the robot if the risk score exceeds a threshold level.

In the following, various examples are provided that may include one or more aspects described above with reference sanitation system 100. The examples provided in relation to the devices may apply also to the described method(s), and vice versa.

Example 1 is a device including a processor configured to detect a plurality of objects in a workspace. The processor is also configured to determine, for each detected object of the plurality of objects, a sanitation score for the detected object based on observations of the detected object over a time period. The processor is also configured to generate a cleaning schedule based on the sanitation score for each detected object, wherein the cleaning schedule includes instructions for a sanitation robot to clean the plurality of objects.

Example 2 is the device of example 1, wherein the observations of the detected object include a frequency with which the detected object is touched over the time period.

Example 3 is the device of either of examples 1 or 2, wherein the cleaning schedule includes a cleaning task associated with cleaning each detected object of the plurality of objects.

Example 4 is the device of any one of examples 1 to 3, further including a sensor configured to collect sensor data about the workspace, wherein the sensor data is indicative of the observations.

Example 5 is the device of example 4, wherein the sensor includes at least one of a camera, a light ranging and detection (LiDAR) sensor, a biological sensor, a radar sensor, or an infrared sensor.

Example 6 is the device of any one of examples 4 to 5, wherein the processor configured to detect the plurality of objects in the workspace includes the processor configured to analyze the sensor data to identify the plurality of objects within the workspace.

Example 7 is the device of example 6, wherein processor configured to analyze the sensor data includes the processor configured to use a neural network identify the plurality of objects.

Example 8 is the device of any one of examples 1 to 7, wherein the observations of each detected object of the plurality of objects are indicative of a surface type of the detected object, wherein the cleaning schedule includes a cleaning task associated with each detected object, and wherein the processor is configured to determine the cleaning task for the detected object based on the surface type of the detected object.

Example 9 is the device of any one of examples 1 to 8, wherein the processor is configured to determine the sanitation score based on a predetermined sanitation score derived from a usage class of each detected object, wherein the usage class includes at least one of a high-touch usage class or a low-touch usage class.

Example 10 is the device of any one of examples 1 to 9, wherein the observations of the detected object include a manner in which the detected object is touched over the time period, wherein the manner is indicative of at least one of a duration of a touch, an extent of area covered by the touch, or a force associated with the touch.

Example 11 is the device of any one of examples 1 to 10, wherein the sanitation score is proportional to a number of persons detected within the workspace during the time period.

Example 12 is the device of any one of examples 1 to 11, wherein the processor is configured to determine the sanitation score based on a layout of the workspace and a location of the detected object within the layout.

Example 13 is the device of any one of examples 1 to 12, the processor configured to determine the sanitation score based on the observations of the detected object includes the processor configured to group the observations into a plurality of observation classes, wherein each observation class of the plurality of observation classes has an associated weighting, wherein the processor is configured to calculate the sanitation score based on a weighted sum of each observation class multiplied by the associated weighting.

Example 14 is the device of example 13, wherein the processor is configured to determine the associated weighting based on a learning model for the observation classes.

Example 15 is the device of any one of examples 13 to 14, wherein the learning model includes a neural network.

Example 16 is the device of any one of examples 1 to 15, wherein the processor is configured to determine the cleaning schedule based on a location of each detected object within the workspace.

Example 17 is the device of example 16, wherein the processor is configured to determine the cleaning schedule based on an object class of each detected object, wherein the object class describes an object type of the detected object.

Example 18 is the device of any one of examples 1 to 17, wherein the device is incorporated into the robot.

Example 19 is the device of any one of examples 1 to 18, wherein the device includes a server that is remote to the robot.

Example 20 is the device of any one of examples 1 to 19, wherein the cleaning schedule includes an ordered list of cleaning tasks, wherein each cleaning task of the ordered list of cleaning tasks is associated with one detected object of the plurality of detected objects Example 21 is the device of example 20, wherein the processor is configured to order the ordered list of cleaning tasks based on a difference between a location of each detected object and a location of the sanitation robot within the workspace.

Example 22 is the device of either of examples 20 or 21, wherein the processor is configured to order the ordered list of cleaning tasks based on a utility value associated with each cleaning task.

Example 23 is the device of any one of examples 20 to 22, wherein the processor is configured to remove a cleaning task from the ordered list of cleaning tasks based on a safety observation at a location of the cleaning task.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising:
   a processor configured to:
   detect a plurality of objects in a workspace;
   determine, for each detected object of the plurality of objects, a sanitation score for the detected object based on observations of the detected object over a time period;
   generate a cleaning schedule based on the sanitation score for each detected object, wherein the cleaning schedule comprises instructions for a sanitation robot to clean the plurality of objects, wherein the cleaning schedule comprises an ordered list of cleaning tasks for the plurality of objects, wherein each object of the plurality of objects is associated with a corresponding cleaning task of the ordered list of cleaning tasks;
   determine, for each cleaning task, a corresponding utility value for the corresponding cleaning task, wherein the corresponding utility value is based on the sanitation score divided by an estimated time to complete the corresponding cleaning task;
   order the ordered list of cleaning tasks based on the corresponding utility value for the corresponding cleaning task; and
   control the sanitation robot to execute the cleaning schedule according to the ordered list of cleaning tasks.

2. The device of claim 1, wherein the observations of the detected object comprise a frequency with which the detected object is touched over the time period.

3. The device of claim 1, further comprising a sensor configured to collect sensor data about the workspace, wherein the sensor data is indicative of the observations.

4. The device of claim 3, wherein the processor configured to detect the plurality of objects in the workspace comprises the processor configured to analyze the sensor data to identify the plurality of objects within the workspace.

5. The device of claim 4, wherein processor configured to analyze the sensor data comprises the processor configured to use a neural network identify the plurality of objects.

6. The device of claim 1, wherein the observations of each detected object of the plurality of objects are indicative of a surface type of the detected object, wherein the cleaning schedule comprises a cleaning task associated with each detected object, and wherein the processor is configured to determine the cleaning task for the detected object based on the surface type of the detected object.

7. The device of claim 1, wherein the processor is configured to determine the sanitation score based on a predetermined sanitation score derived from a usage class of each detected object, wherein the usage class comprises at least one of a high-touch usage class or a low-touch usage class.

8. The device of claim 1, wherein the observations of the detected object comprise a manner in which the detected object is touched over the time period, wherein the manner is indicative of at least one of a duration of a touch, an extent of area covered by the touch, or a force associated with the touch.

9. The device of claim 1, wherein the sanitation score is proportional to a number of persons detected within the workspace during the time period.

10. The device of claim 1, wherein the processor is configured to determine the sanitation score based on a layout of the workspace and a location of the detected object within the layout.

11. The device of claim 1, the processor configured to determine the sanitation score based on the observations of the detected object comprises the processor configured to group the observations into a plurality of observation classes, wherein each observation class of the plurality of observation classes has an associated weighting, wherein the processor is configured to calculate the sanitation score based on a weighted sum of each observation class multiplied by the associated weighting.

12. The device of claim 1, wherein the processor is configured to determine the cleaning schedule based on a location of each detected object within the workspace.

13. The device of claim 12, wherein the processor is configured to determine the cleaning schedule based on an object class of each detected object, wherein the object class describes an object type of the detected object.

14. The device of claim 1, wherein the device comprises a server that is remote to the sanitation robot.

15. A non-transitory computer readable medium, including instructions which, if executed, cause a processor to:
   detect a plurality of objects in a workspace;
   determine, for each detected object of the plurality of objects, a sanitation score for the detected object based on observations of the detected object over a time period;
   generate a cleaning schedule based on the sanitation score for each detected object, wherein the cleaning schedule comprises instructions for a sanitation robot to clean the plurality of objects, wherein the cleaning schedule comprises an ordered list of cleaning tasks for the plurality of objects, wherein each object of the plurality of objects is associated with a corresponding cleaning task of the ordered list of cleaning tasks;
   determine, for each cleaning task, a corresponding utility value for the corresponding cleaning task, wherein the corresponding utility value is based on the sanitation score divided by an estimated time to complete the corresponding cleaning task;

order the ordered list of cleaning tasks based on the corresponding utility value for the corresponding cleaning task; and control the sanitation robot to execute the cleaning schedule according to the ordered list of cleaning tasks.

16. The non-transitory computer readable medium of claim 15, wherein the processor is configured to order the ordered list of cleaning tasks based on a difference between a location of each detected object and a location of the sanitation robot within the workspace.

17. The non-transitory computer readable medium of claim 15, wherein the processor is configured to remove a cleaning task from the ordered list of cleaning tasks based on a safety observation at a location of the cleaning task.

18. The device of claim 1, wherein the processor configured control the sanitation robot to execute the cleaning schedule according to the ordered list of cleaning tasks comprises the processor configured to control the sanitation robot to:

execute a first cleaning task in the ordered list of cleaning tasks;

redetermine, for each cleaning task, the corresponding utility value for the corresponding cleaning task;

reorder the ordered list based on the corresponding utility value for the corresponding cleaning task; and preempt execution of the first cleaning task with execution of an other cleaning task of the ordered list based on the corresponding utility value of the other cleaning task being higher than the utility value of the first cleaning task.

* * * * *